US 6,640,849 B1

(12) United States Patent
Liao

(10) Patent No.: US 6,640,849 B1
(45) Date of Patent: Nov. 4, 2003

(54) WOOD LATHE WITH A TRACING UNIT

(76) Inventor: Juei-Seng Liao, No. 295, Sec. 1, Nanking E. Rd., Taichung City (TW)

(*) Notice: Subject to any disclaimer, the term of this patent is extended or adjusted under 35 U.S.C. 154(b) by 0 days.

(21) Appl. No.: 10/013,171

(22) Filed: Dec. 7, 2001

(30) Foreign Application Priority Data

Oct. 15, 2001 (TW) .................................... 90217523 U

(51) Int. Cl.⁷ .......................... B27C 7/06; B23B 3/28; B23Q 35/10; B23Q 35/28
(52) U.S. Cl. .......................... 142/38; 82/11.1; 82/132; 82/137; 142/55
(58) Field of Search .................. 142/21, 27, 37–39, 142/49, 55; 82/11–11.2, 137, 158, 132

(56) References Cited

U.S. PATENT DOCUMENTS

| 1,484,286 | A | * | 2/1924 | Alber | 142/37 |
|---|---|---|---|---|---|
| 2,769,466 | A | * | 11/1956 | Brauneis | 142/55 |
| 2,919,727 | A | * | 1/1960 | Brewer, Jr. | 142/55 |
| 3,204,671 | A | * | 9/1965 | Schoenrock | 142/7 |
| 3,332,458 | A | * | 7/1967 | Baldwin | 142/38 |
| 3,405,745 | A | * | 10/1968 | Schoonover et al. | 142/1 |
| 4,608,889 | A | * | 9/1986 | Kollar | 82/11.1 |
| 5,063,799 | A | * | 11/1991 | Brewer | 82/158 |
| 5,884,680 | A | * | 3/1999 | Kuo | 142/38 |

FOREIGN PATENT DOCUMENTS

EP 275775 A2 * 7/1988 ............ 82/19

* cited by examiner

Primary Examiner—Steven C. Bishop
(74) Attorney, Agent, or Firm—Webb Ziesenheim Logsdon Orkin & Hanson P.C.

(57) ABSTRACT

A wood lathe includes an axial moving unit with a movable seat, which is sleeved movably on a driving rod and a guide rod that are parallel to each other. A driving gear is disposed rotatably on the movable seat, and engages a gear-engaging member of the driving rod. When an actuator member is rotated, the gear rotates synchronously therewith so as to move the movable seat on the driving rod. A sample bar and a bar blank are held on a bed of the lathe. A blade is carried on the movable seat for cutting the bar blank. A tracing unit is disposed on the movable seat so that a groove pattern on the sample bar is traced mechanically and is duplicated on the bar blank.

7 Claims, 13 Drawing Sheets # WOOD LATHE WITH A TRACING UNIT

CROSS REFERENCE TO RELATED APPLICATION

This application claims priority of Taiwanese Application No. 90217523, filed on Oct. 15, 2001.

BACKGROUND OF THE INVENTION

1. Field of the Invention

This invention relates to a wood lathe, and more particularly to a wood lathe including a tracing unit, by which a groove pattern on a sample bar is traced mechanically and is duplicated on a bar blank.

2. Description of the Related Art

Referring to FIGS. 1, 2 and 3, a conventional wood lathe 10 is shown to include a lathe bed 11, a blank-holding unit 12, a sample-holding unit 13, a moving unit 14, a blade unit 15, a tracing unit 16, and a tension spring 17. The blank-holding unit 12 consists of a headstock 121 and a tailstock 122, which are provided with a pair of clamping elements 1211, 1221 that clamp and fix a wood bar blank (not shown) therebetween. An output shaft (not shown) is journalled to the headstock 121, and is connected fixedly to the clamping element 1211 so as to rotate the bar blank (not shown) when the output shaft rotates. The sample-holding unit 13 includes two bases 131 that are disposed slidably on and that are locked releaseably on the lathe bed 11, two support frames 132 that are inserted respectively into two hollow posts 1311 of the bases 131, two height-adjustable movable members 133 that are sleeved respectively on the support frames 132, two horizontal mounting rods 134 that are connected fixedly to the movable members 133, and two clamping elements 135 that are connected respectively and fixedly to the connecting rods 134 and that clamp and fix a sample bar (not shown) therebetween.

The moving unit 14 includes a track unit 141 that is connected fixedly to top ends of the support frames 132, and an interior sliding block 142 that is disposed longitudinally and movably within the track unit 141. A generally U-shaped exterior sliding seat 143 is disposed movably on an outer surface of the track unit 141. A bottom sliding member 144 is connected fixedly to the interior sliding block 142 and the exterior sliding seat 143, and is disposed movably on a bottom portion of the track unit 141. A bottom cover 145 is disposed to close a bottom opening 1441 in the bottom sliding member 144. A handle 146 is fixed to a horizontal top plate portion 1431 (see FIG. 3) of the exterior sliding seat 143.

The blade unit 15 includes a blade-mounting rod 151, and a blade 152 that is mounted fixedly to the blade-mounting rod 151 and that is inserted between the bottom sliding member 144 and the bottom cover 145. The tracing unit 16 includes a vertical connecting rod 161 that is connected fixedly to the blade-mounting rod 151, an annular adjustment element 162 that is sleeved movably on and that is locked releaseably on the connecting rod 161, and a follower roller 163 that is mounted rotatably on the adjustment element 162 and that is biased by the spring 17 to press against a lateral side of the sample bar (not shown). When the handle 146 is moved along the track unit 141, the follower roller 163 slides over the lateral side of the sample bar (not shown) along a curved path so that the blade 152 moves synchronously with the follower roller 163. Accordingly, a groove pattern on the sample bar (not shown) is traced mechanically, and is duplicated on the bar blank (not shown). The aforesaid conventional wood lathe 10 suffers from a drawback in that no effective guiding and stabilizing means are provided for the exterior sliding seat 143, thereby resulting in vibration of the blade unit 15 when the follower roller 163 slides on the sample bar (not shown). As such, the blade 152 cannot move smoothly during operation.

SUMMARY OF THE INVENTION

The object of this invention is to provide a wood lathe, which includes a tracing unit and a blade that can move smoothly during operation.

According to this invention, a wood lathe includes an axial moving unit with a movable seat, which is sleeved movably on a driving rod and a guide rod that are parallel to each other. A driving gear is disposed rotatably on the movable seat, and engages a gear-engaging member of the driving rod. When an actuator member is rotated, the gear rotates synchronously therewith so as to move the movable seat on the driving rod. A sample bar and a bar blank are held on a bed of the lathe. A blade is carried on the movable seat for cutting the bar blank. A tracing unit is disposed on the movable seat so that a groove pattern on the sample bar is traced mechanically and is duplicated on the bar blank. Because the movable seat is moved on the driving rod by rotating the actuator member, the movements of the movable seat and the blade are stabilized. Furthermore, the movable seat is guided effectively to move smoothly in a direction by means of the guide rod.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
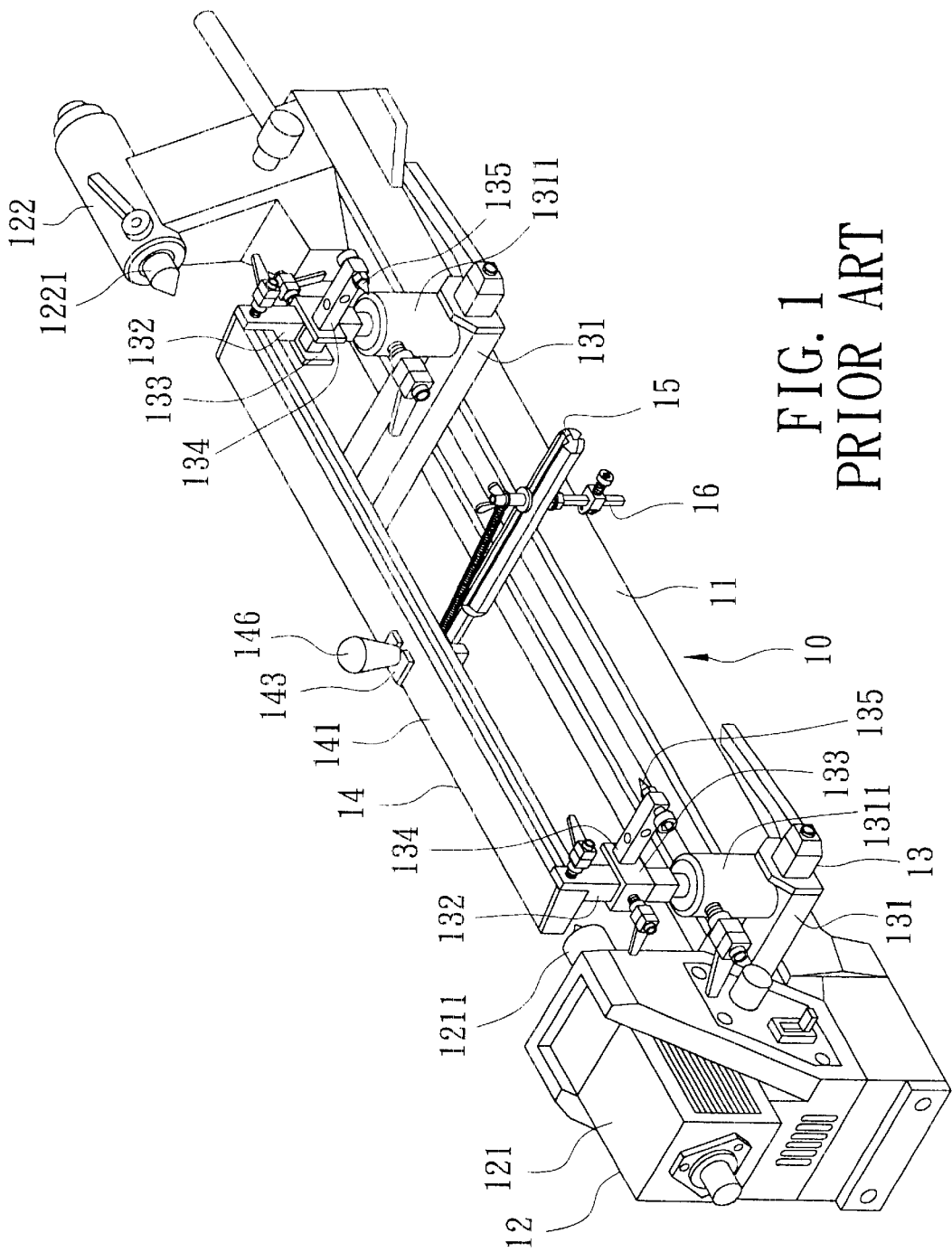
FIG. 1 is an assembled perspective view of a conventional wood lathe.
Figure 2:
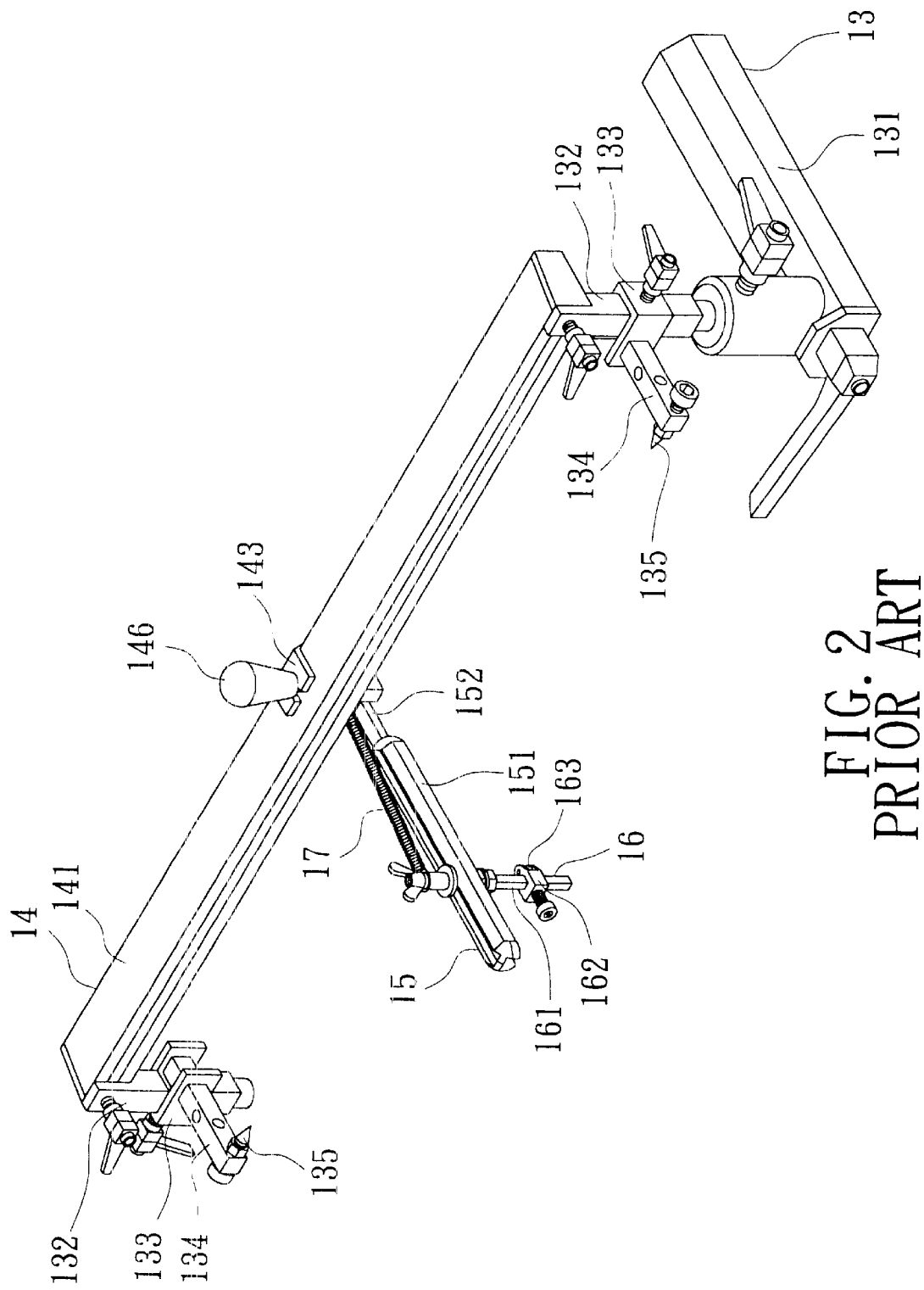
FIG. 2 is an assembled fragmentary perspective view of the conventional wood lathe.
Figure 3:
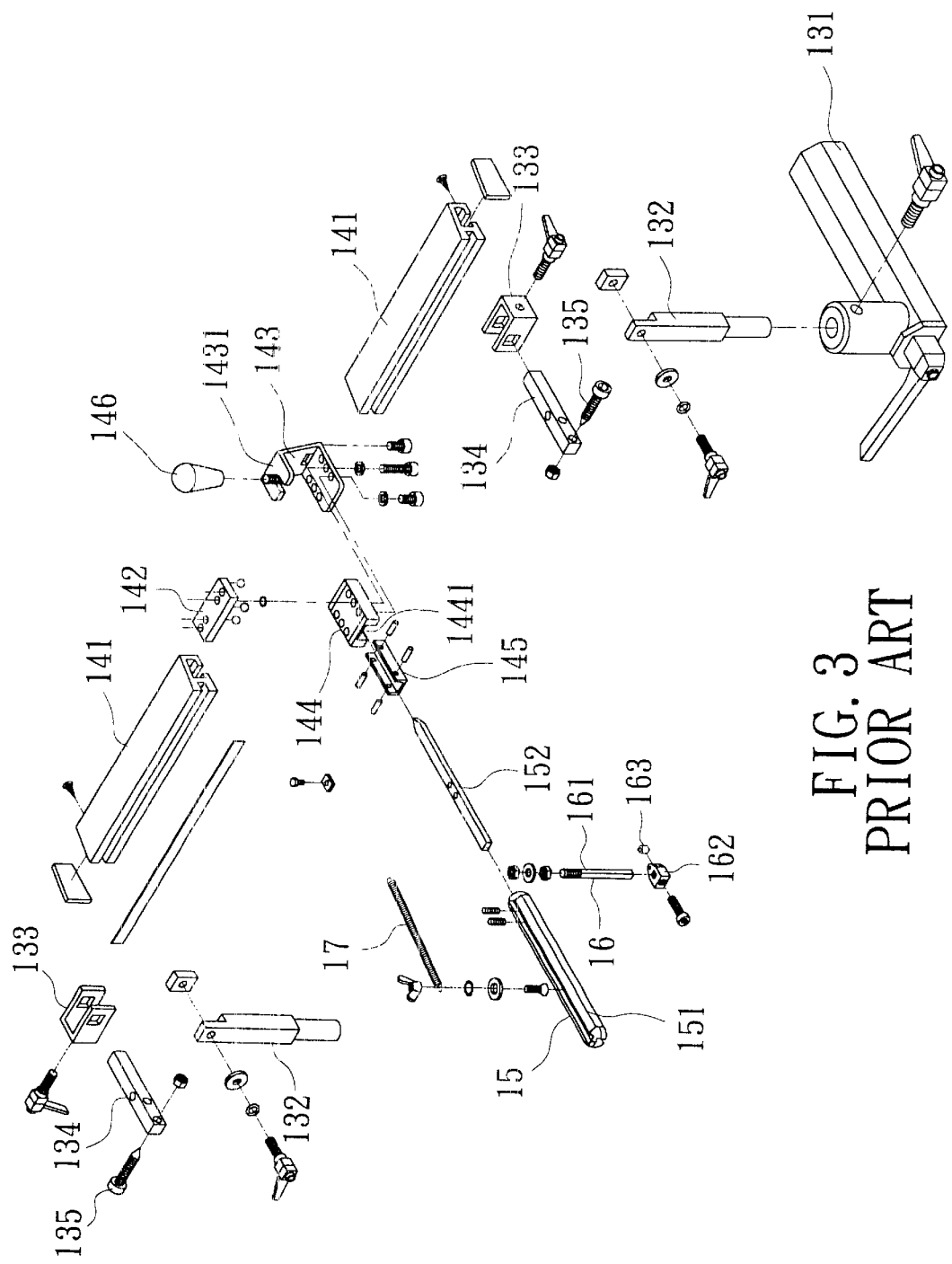
FIG. 3 is a fragmentary exploded perspective view of the conventional wood lathe.
Figure 4:
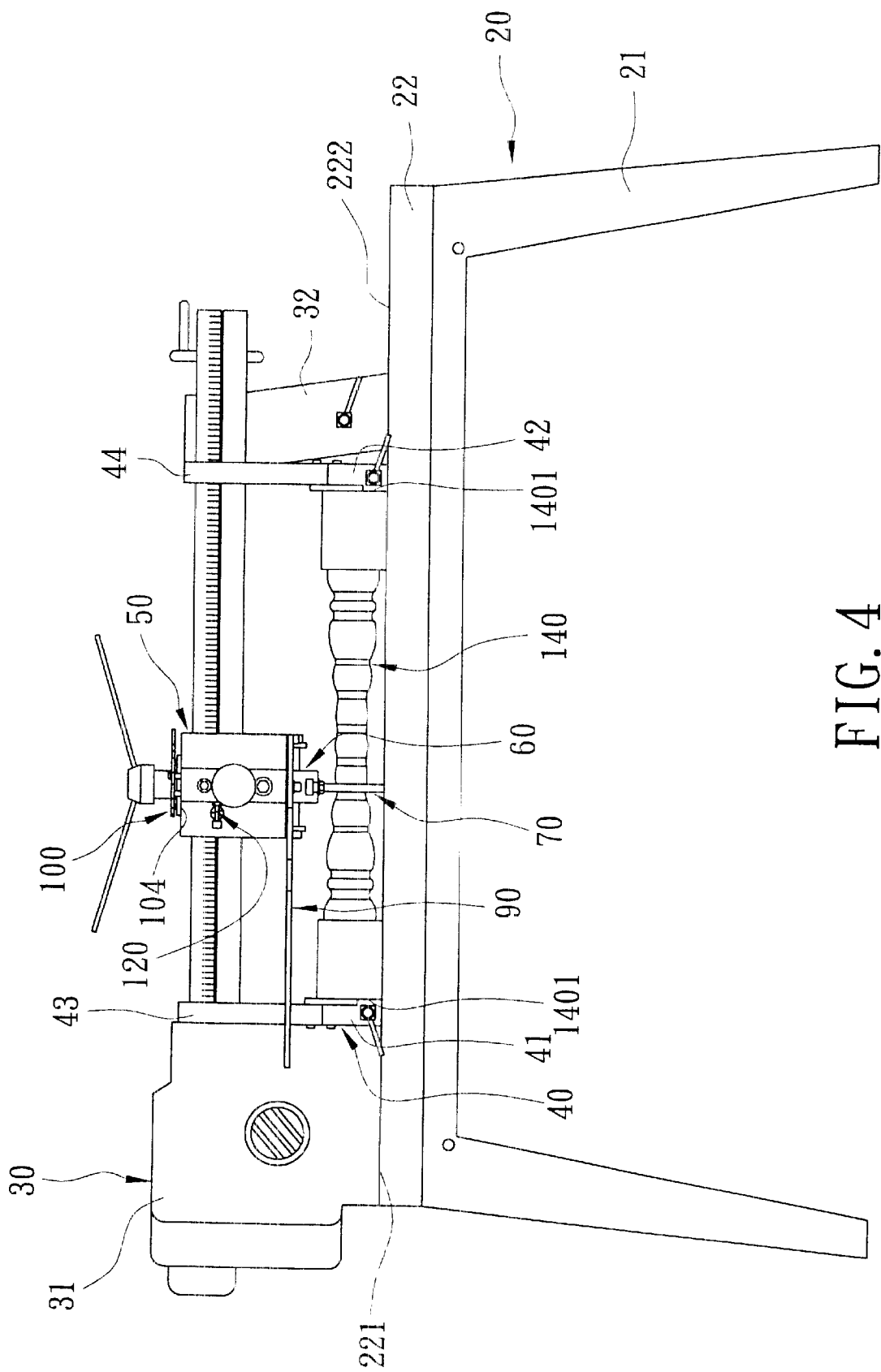
FIG. 4 is a front view of the preferred embodiment of a wood lathe according to this invention.
Figure 5:
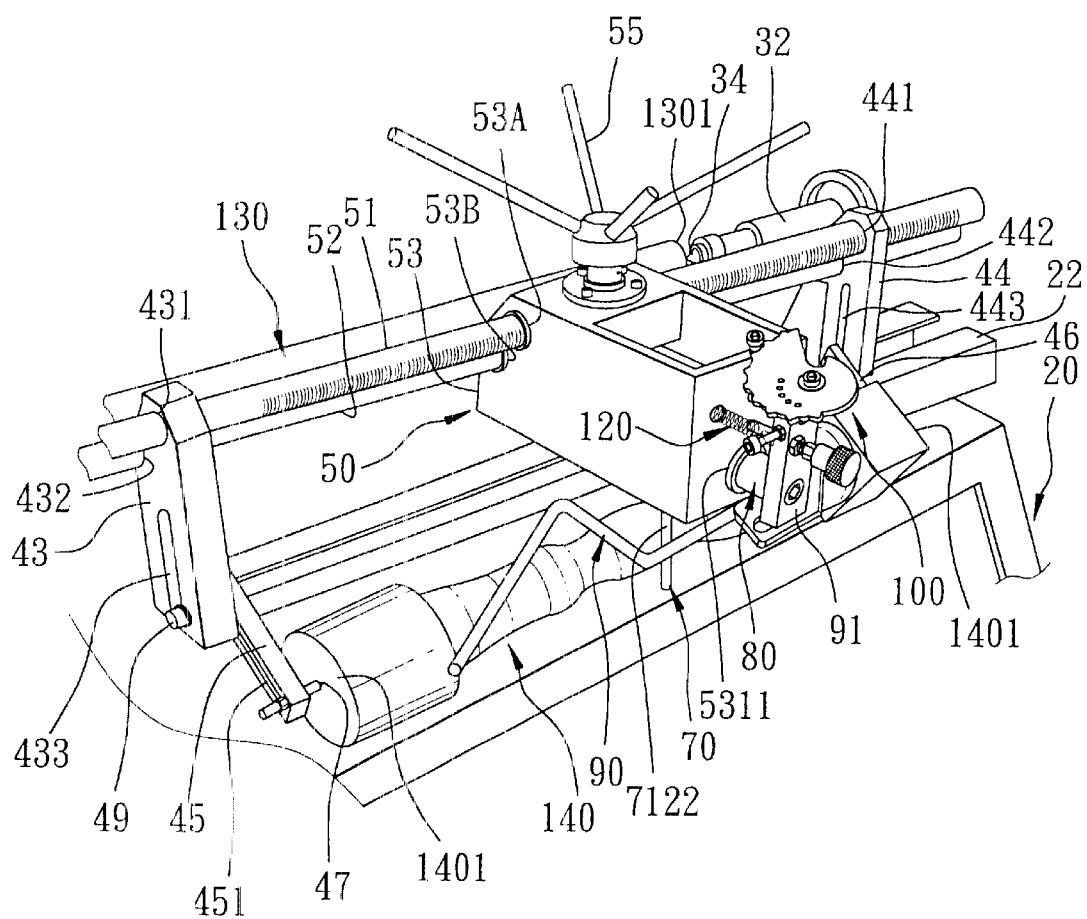
FIG. 5 is an assembled fragmentary perspective view of the preferred embodiment, illustrating a front side of a movable seat.
Figure 6:
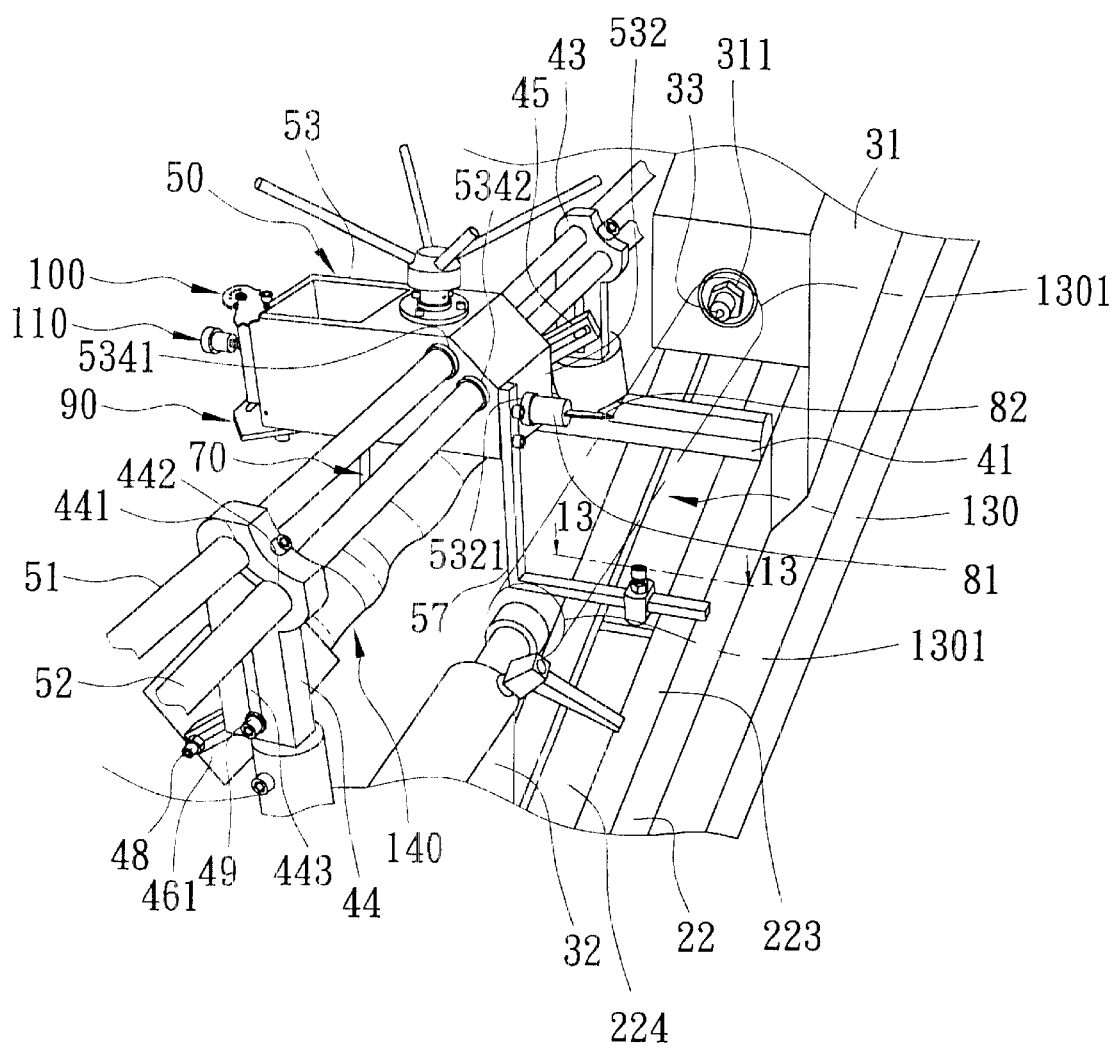
FIG. 6 is an assembled fragmentary perspective view of the preferred embodiment, illustrating a rear side of the movable seat.

Referring to FIGS. 4, 5, and 6, the preferred embodiment of a wood lathe according to this invention is shown to include a lathe bed 20, a blank-holding unit 30, a sample-holding unit 40, an axial moving unit 50, a radial moving unit 60, a tracing unit 70, a blade unit 80 (see FIG. 5), a manual operating unit 90, a cutting depth-fixing unit 100, a cutting depth-adjusting bolt 110 (see FIG. 6), and a coiled tension spring 120. A cylindrical bar blank 130 and a sample bar 140 are held on the lathe bed 20, and extend along the length of the lathe bed 20.

The lathe bed 20 includes four legs 21 (only two are shown in FIG. 4) that are disposed respectively at four corners thereof, and a longitudinally extending track unit 22 that is provided on a top surface of the lathe bed 20 and that has a first end 221 and a second end 222.

The blank-holding unit 30 includes a headstock 31 that is disposed fixedly on the first end 221 of the track unit 22 and that is provided with a motor-operated output shaft 311, and a tailstock 32 that is disposed movably on the second end 222 of the track unit 22. A first clamping element 33 is connected fixedly to the output shaft 311. A second clamping element 34 is disposed rotatably on the tailstock 32. The bar blank 130 is clamped and is fixed between the first and second clamping elements 33, 34 so as to rotate synchronously with the first clamping element 33 when the output shaft 311 rotates.

The sample-holding unit 40 includes a pair of first and second bases 41, 42 that are disposed movably on and that are locked releaseably on the track unit 22, and a pair of vertical first and second support plates 43, 44 that are disposed movably on and that are locked releaseably on the first and second bases 41, 42. Each of the first and second support plates 43, 44 has an upper positioning hole 431, 441, a lower positioning hole 432, 442, and a vertical slide slot 433, 443. A pair of elongated first and second adjusting seats 45, 46 are disposed movably on and are locked releaseably on the first and second support frames 43, 44 by two lock bolts 49 that extend through the slide slots 433, 443, respectively. Two clamping elements 47, 48 extend through two slide slots 451, 461 in the adjusting seats 45, 46, and have threaded ends that engage two nuts so as to lock the clamping elements 47, 48 on the adjusting seats 45, 46. The lock bolts 49 extend through the slide slots 451, 461 in the adjusting seats 45, 46. The sample bar 140 is clamped and is fixed between the clamping elements 47,48. As such, the height and the horizontal position of the sample bar 140 can be adjusted with respect to the lathe bed 20.

Referring to FIGS. 4, 5, 6, and 7, the axial moving unit 50 includes a horizontal driving rod 51, a horizontal guide rod 52, a movable seat 53, a driving gear 54, an actuator member 55, and a bearing unit 56. The driving rod 51 has two ends that are fixed respectively within the upper positioning holes 431, 441 in the first and second support frames 43, 44, and extends in an axial direction of the bar blank 130. The guide rod 52 has two ends that are fixed respectively within the lower positioning holes 432, 442 in the first and second support frames 43, 44, and is disposed below, behind, and parallel to the driving rod 51. The movable seat 53 has a vertical front side wall 531, a vertical rear side wall 532, a vertical first side wall 533, a vertical second side wall 534, an interior chamber 535, a horizontal top side wall 536, and an inclined wall 537. The first and second side walls 533, 534 extend respectively, integrally and rearwardly from two opposite sides of the front side wall 531. Each of the first and second side walls 533, 534 is formed with an upper circular hole (53A, 5341) (see FIGS. 5 and 6) and a lower circular hole (53B, 5342) The driving rod 51 and the guide rod 52 extend respectively through the upper and lower circular holes (53A, 53B, 5341, 5342) in the movable seat 53. This is to say, the movable seat 53 is sleeved slidably on the driving rod 51 and the guide rod 52, and is guided by the guide rod 52 to move in the axial direction of the bar blank 130.

Figure 7:
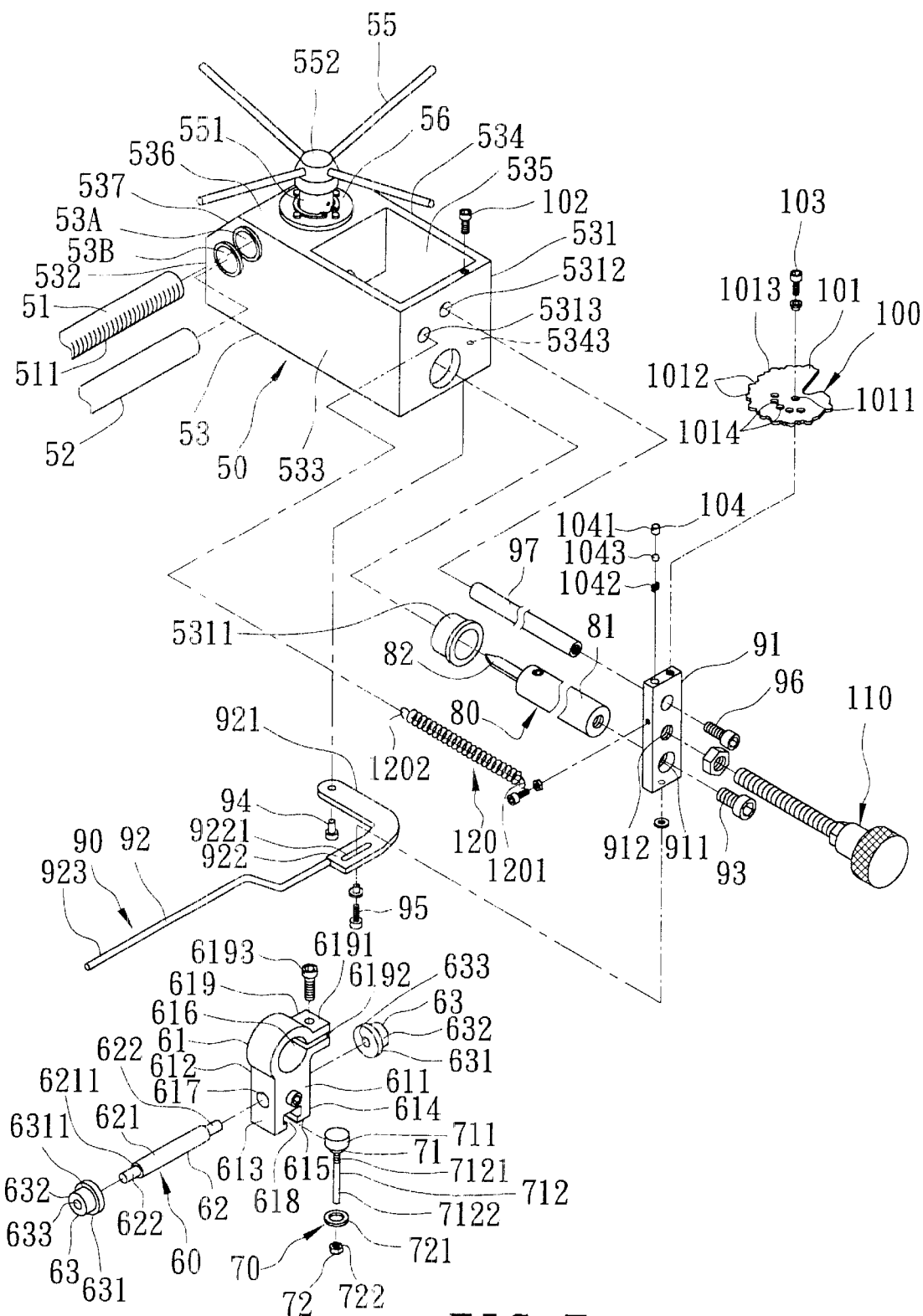
FIG. 7 is a fragmentary exploded perspective view of the preferred embodiment, in which a lathe bed, a blank-holding unit and a sample-holding unit are removed for the sake of brevity.
Figure 8:
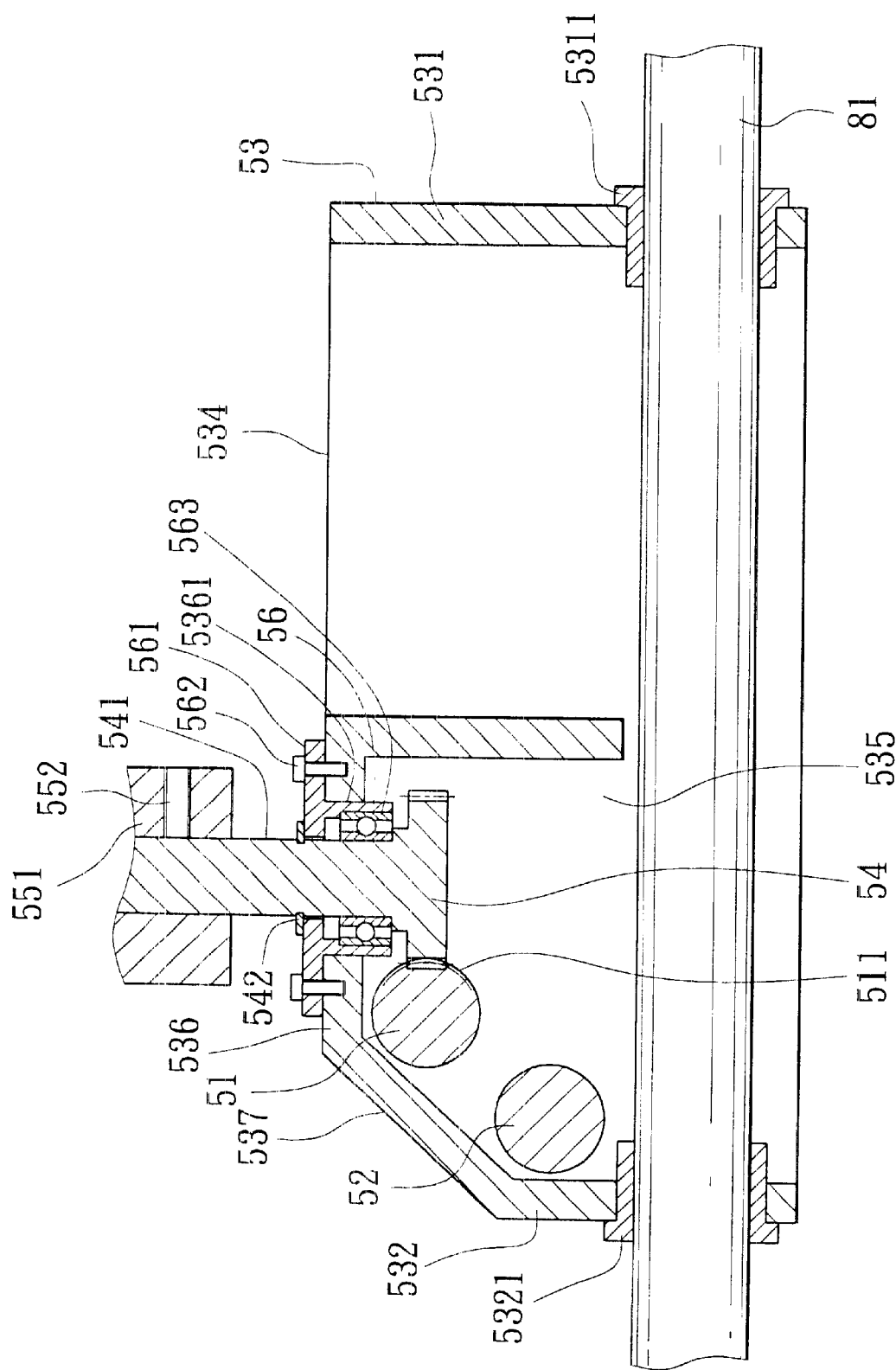
FIG. 8 is a partly sectional view of an axial moving unit and a blade-mounting rod of the preferred embodiment.
Figure 9:
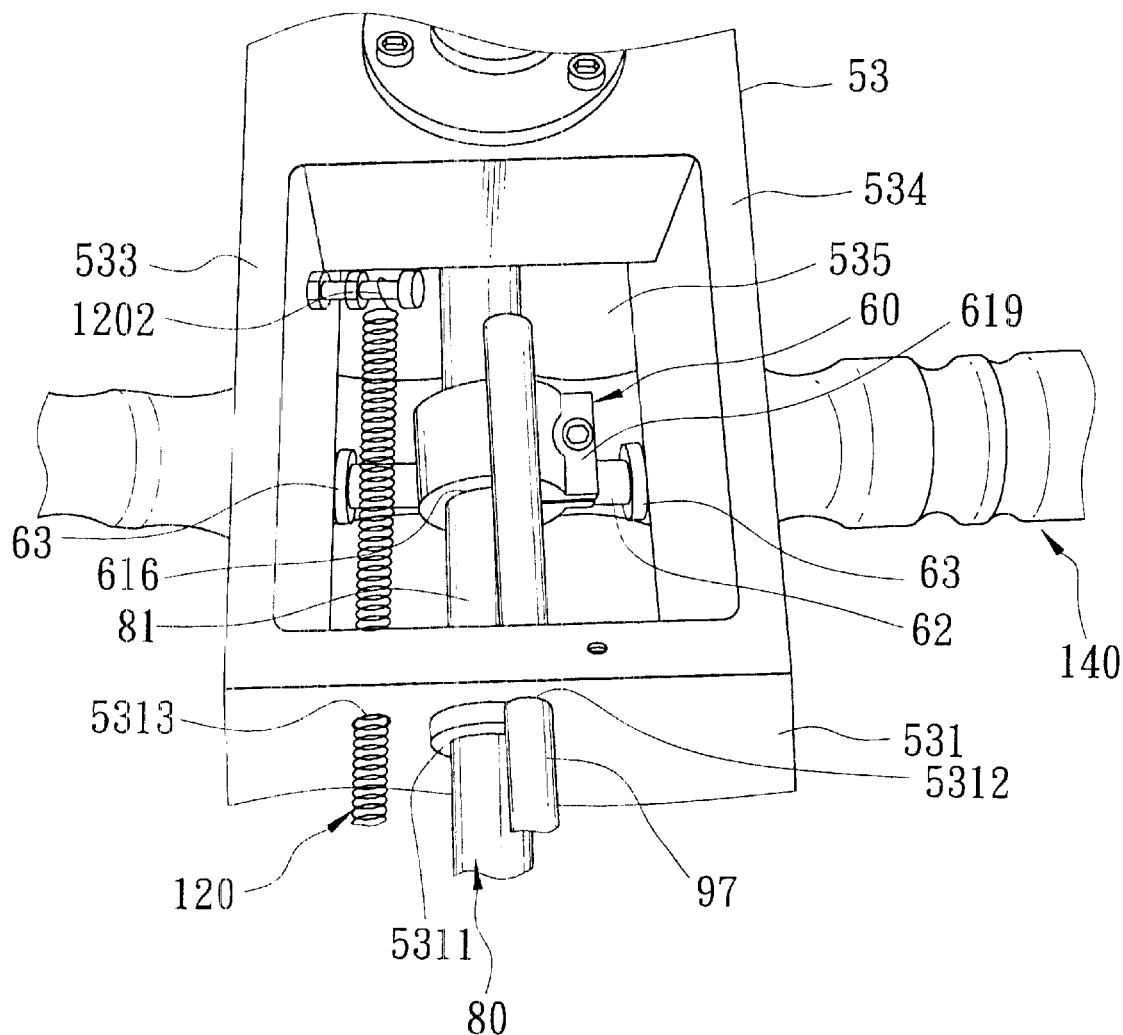
FIG. 9 is an assembled fragmentary perspective view of the preferred embodiment, viewed from the top, illustrating how a carrier is guided to move on the movable seat.

Referring to FIGS. 7 and 8, the driving gear 54 is disposed rotatably in the interior chamber 535 between the front and rear side walls 531, 532 and between the first and second side walls 533, 534, is configured as a pinion, and engages a gear-engaging member 511 of the driving rod 51, which is configured as a horizontal row of teeth that serves as a rack. Accordingly, when the driving gear 54 rotates, the movable seat 53 moves on the driving rod 51. The driving gear 54 has an integral rotating shaft portion 541 that is journalled to the movable seat 53 by means of the bearing unit 56, and is positioned relative to the movable seat 53 by means of a C-shaped retaining ring 542 that can prevent downward movement of the driving gear 54. The actuator member 55 projects outwardly from the movable seat 53, and has a lower end with a lower sleeve portion 551 that is sleeved on and that is locked on the rotating shaft portion 541 of the driving gear 54 by a lock bolt 552, thereby connecting the actuator member 55 fixedly to the driving gear 54. An upper end of the actuator member 55 is formed integrally with a plurality of angularly equidistant, radially and outwardly extending rotary levers. A retaining plate unit 561 is locked on the movable seat 53 by two lock bolts 562, thereby confining the driving gear 54 within the movable seat 53. Because the movable seat 53 is driven by rotating the rotary levers of the actuator member 55, and is sleeved on the driving rod 51 and the guide rod 52, it can move smoothly.

Figure 13:
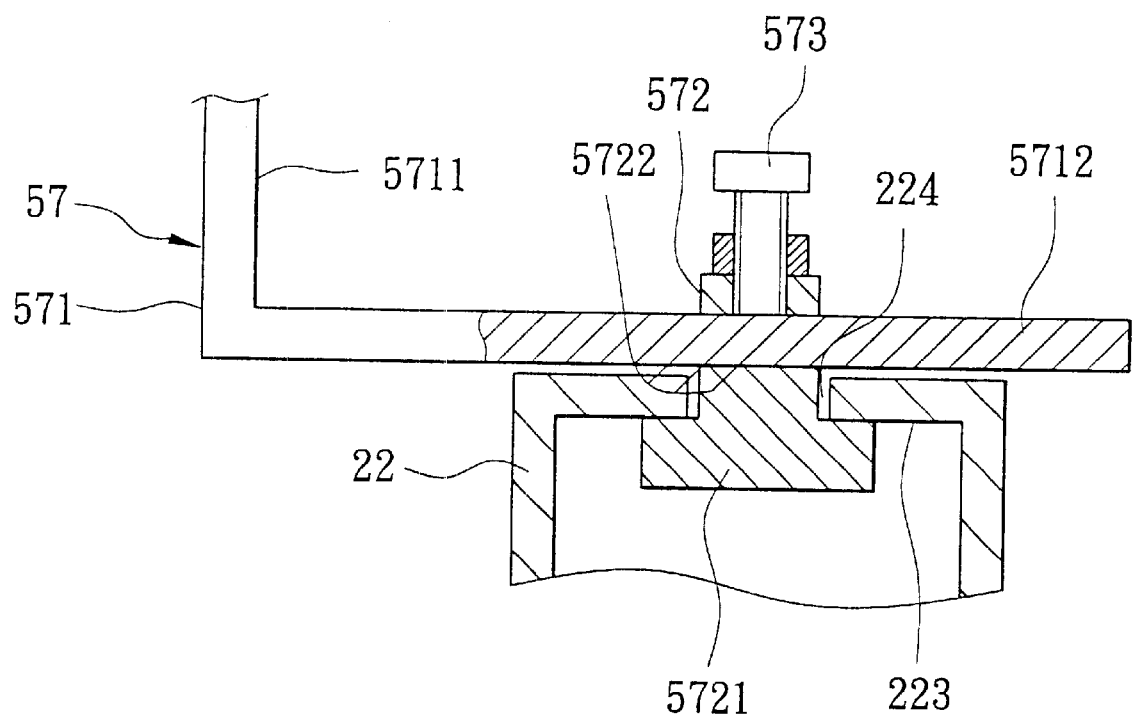
FIG. 13 is a sectional view taken along Line 13—13 in FIG. 6.

Referring to FIGS. 6 and 13, the axial moving unit 50 further has a supporting assembly 57, which includes an L-shaped support frame 571 and a sliding element 572. The support frame 571 is formed with a vertical frame portion 5711 that is bolted to the movable seat 53, and a horizontal frame portion 5712 that is formed integrally with an end of the vertical frame portion 5711 at an end thereof. The track unit 22 has a horizontal top wall 223, which is formed with a slide slot 224. The sliding element 572 has an integral bottom plate 5721 that abuts against a bottom surface of the top wall 223 of the track unit 22, and a sleeve portion 5722 that extends through the slide slot 224 in the top wall 223 of the track unit 22. The sleeve portion 5722 is sleeved slidably on and is locked on the horizontal frame portion 5712 by a lock bolt 573. As such, the movable seat 53 is supported on the supporting assembly 57, thereby further stabilizing movement of the former.

Referring to FIGS. 7, 9, 10, 11, and 12, the radial moving unit 60 includes a carrier 61, an axle 62, and two wheels 63. The carrier 61 has a front side surface 611, a rear side wall 612, a first side wall 613, a second side wall 614, a bottom wall 615, a retaining hole 616, and an axle hole 617. The axle 62 has a middle portion 621 that extends through the axle hole 617 in the carrier 61, and two diameter-reduced ends 622, on which the wheels 63 are sleeved respectively. Each of the wheels 63 has a large-diameter inner wheel portion 631 that abuts against an inner surface of a respective one of the first and second side walls 533, 534 of the movable seat 53 at an outer end surface 6311 (see FIG. 11) and that abuts against an outer end surface 6211 of the middle portion 621 of the axle 62, and a small-diameter outer wheel portion 632 that has a diameter smaller than that of the inner wheel portion 631 and that abuts against a bottom surface of the respective one of the first and second side walls 533, 534 of the movable seat 53 at an inner end surface 6312 (see FIG. 11) As such, the carrier 61 is guided to move in the radial direction of the bar blank 130 (see FIG. 5).

Figure 10:
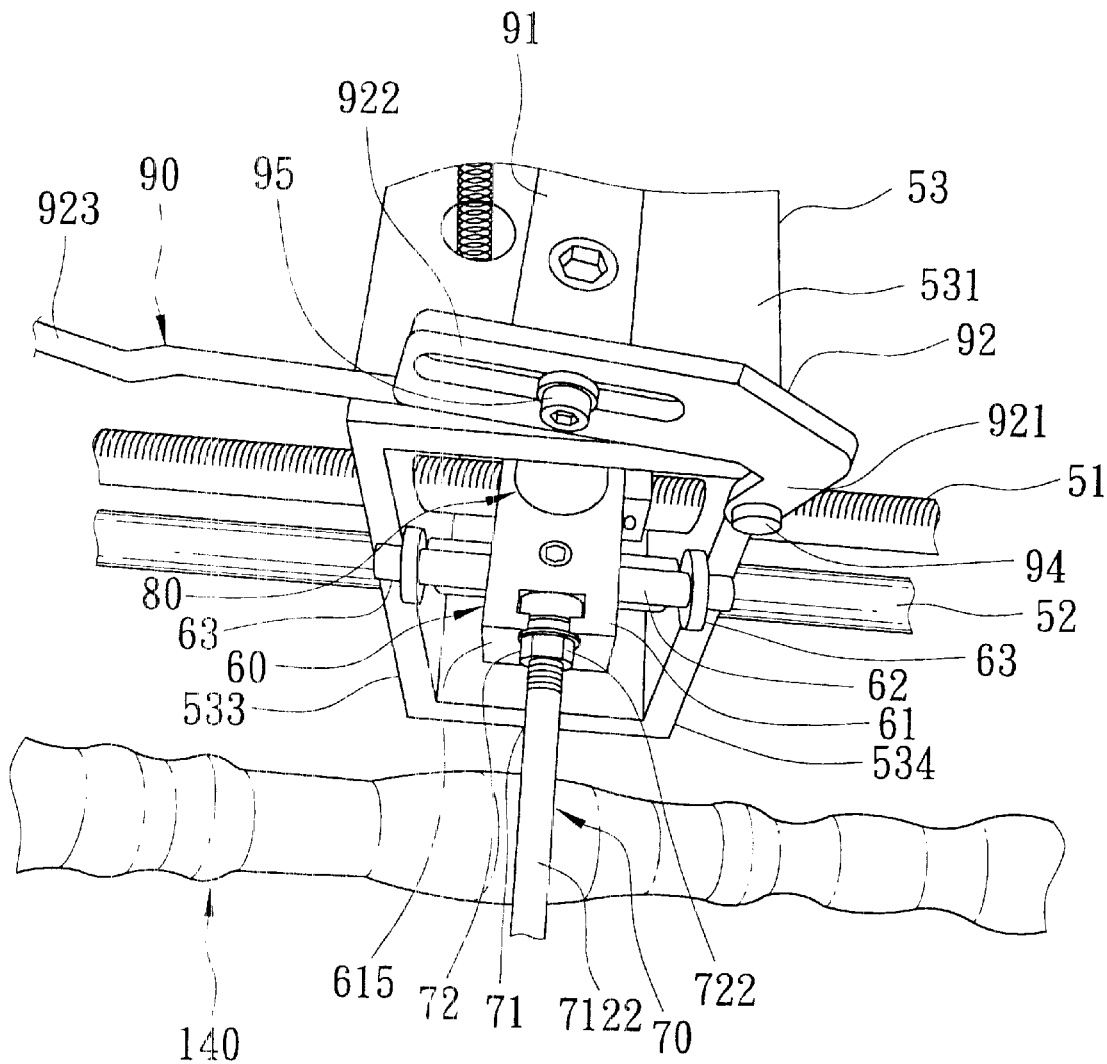
FIG. 10 is an assembled fragmentary perspective view of the preferred embodiment, viewed from the bottom, illustrating how the carrier is guided to move on the movable seat.
Figure 11:
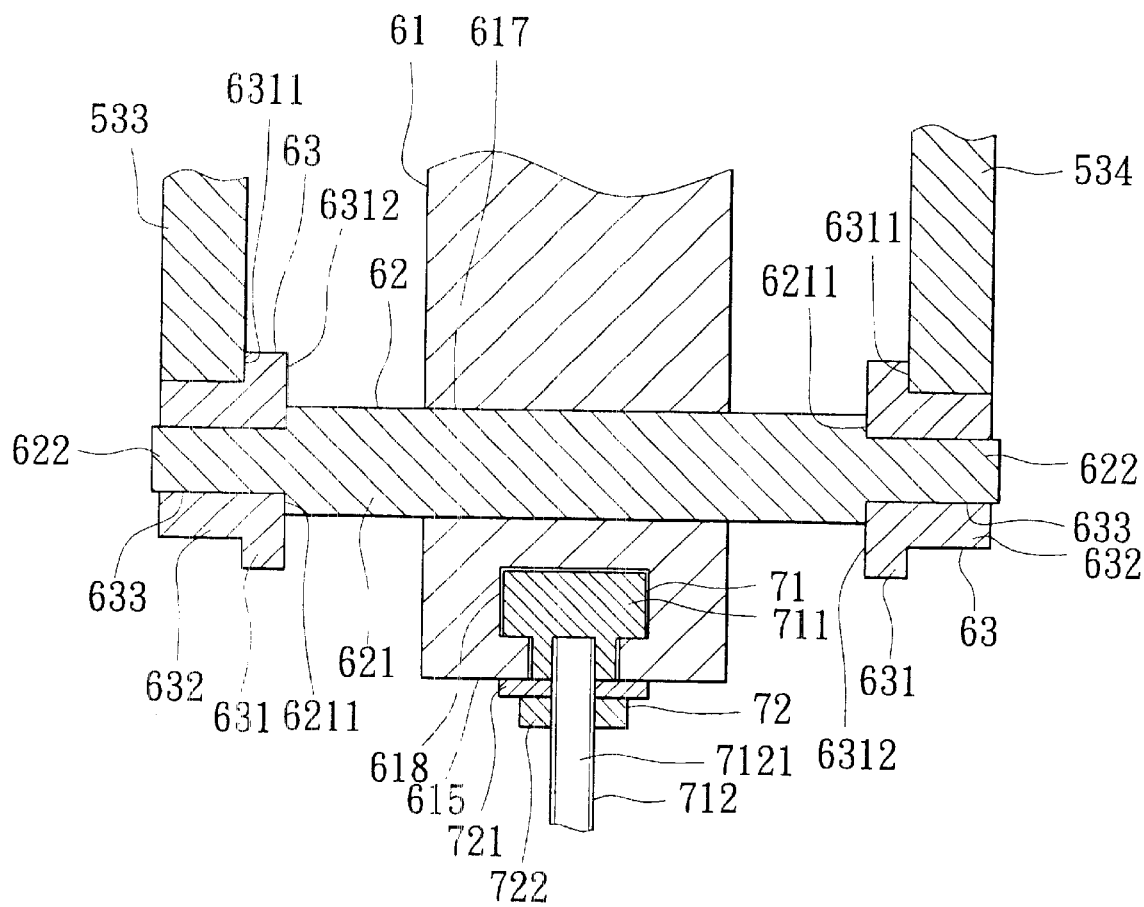
FIG. 11 is a fragmentary, partly sectional view of the preferred embodiment, illustrating how a follower post is connected to the carrier.

Referring to FIGS. 7, 10, and 11, the bottom surface 615 of the carrier 61 is formed with a dovetail groove 618 that has a T-shaped cross-section. The tracing unit 70 includes a follower unit 71 and a locking unit 72. The follower unit 71 includes an internally threaded cap 711 which is confined within the dovetail groove 618 in the carrier 61, and a vertical follower post 712 which has an externally threaded upper end 7121 that engages the cap 711 threadably, thereby connecting the follower post 712 fixedly to the cap 711, and a lower portion 7122 that abuts against the sample bar 140. The locking unit 72 includes a washer 721 that is sleeved on the threaded upper end 7121 of the follower post 712 and that abuts against the bottom surface 615 of the carrier 61, and a lock nut or a lock member 722 that engages the upper end 7121 of the follower post 712 so as to press the washer 721 against the bottom surface 615 of the carrier 61, thereby fixing the follower post 712 to the carrier 61. When the lock nut 722 is loosened, the follower post 712 can move along the dovetail groove 618 of the carrier 61.

Referring to FIGS. 7, 8, 9, and 10, the blade unit 80 includes a cylindrical, horizontal blade-mounting rod 81 that is disposed movably on the carrier 61 and that extends through two bushings 5311, 5321 on the front and rear side walls 531, 532 of the movable seat 53, and a blade 82 that is connected fixedly to a rear end of the blade-mounting rod 81. An upper end of the carrier 61 is shaped as a C-shaped clamp 619 that clamps the blade-mounting rod 81 therein. The clamp 619 includes upper and lower clamp ends 6191 that are formed respectively with an unthreaded hole and a threaded hole and that define a slit 6192 therebetween, and a lock bolt 6193 that engages the threaded holes in the clamp ends 6191 so as to lock the blade-mounting rod 81 within the clamp 619. As such, when the lock bolt 6193 is loosened, the blade-mounting rod 81 can move on the carrier 61.

The front side wall 531 of the movable seat 53 is formed with a rail hole 5312 and a blade hole 5313. The manual operating unit 90 includes a vertical plate 91, an operating lever 92, a horizontal rod-locking bolt 93, a vertical pivot pin 94, a vertical engaging bolt 95, a rail-locking bolt 96, and a horizontal guide rail 97. The vertical plate 91 is bolted to the blade-mounting rod 81 by the rod-locking bolt 93. The operating lever 92 has a pivot end 921 that is mounted rotatably to the movable seat 53 by the pivot pin 94, an intermediate portion 922 that is shaped as a horizontal strip and that is formed with a longitudinal slide slot 9221, and a grip end 923. The pin 94 is fixed within a hole 5343 (see FIG. 7) in the movable seat 53. The engaging bolt 95 is fixed to a bottom surface of the vertical plate 91, and extends through the slide slot 9221 in the operating lever 92 so as to convert rotation of the operating lever 92 into movement of the vertical plate 91. The guide rail 97 is connected fixedly to the vertical plate 91 by the rail-locking bolt 96, and extends rearward from a rear side surface of the vertical plate 91 and through the rail hole 5312 in the front side wall 531 of the movable seat 53. The guide rail 97 engages fittingly and slidably the rail hole 5312, and extends in the radial direction of the bar blank 130 (see FIG. 5) so as to guide the blade 82 to move in the radial direction of the bar blank 130 (see FIG. 5).

The spring 120 has a front end that is fastened to the vertical plate 91, and a rear end that is fastened to the movable seat 53 so as to pull the vertical plate 91 toward the front side wall 531 of the movable seat 53.

The cutting depth-fixing unit 100 includes a horizontal adjusting disk 101, a positioning post 102, a vertical pivot bolt 103, and a spring-biased ball unit 104. The adjusting disk 101 is disposed above and locked on the vertical plate 91 by the pivot bolt 103, and has a pivot hole 1011, through which the pivot bolt 103 extends, and a series of positioning notches 1012 that are formed along a curved outer peripheral portion 1013 of the adjusting disk 101 and that are spaced apart from the pivot bolt 103 at different distances. The positioning bolt 102 is fixed on an upper end of the front side wall 531 of the movable seat 53, and engages a selected one of the positioning notches 1012 in the adjusting disk 101 so that the vertical plate 91 is spaced apart from the front side wall 531 of the movable seat 53 at a predetermined distance. As such, when the pivot bolt 103 is loosened, the adjusting disk 101 can be rotated thereabout such that the positioning bolt 102 disengages from the selected one of the positioning notches 1012 and engages another one of the positioning notches 1012, thereby varying the distance between the vertical plate 91 and the front side wall 531 of the movable seat 53 so as to adjust the position of the blade 82 relative to the carrier 61 along the radial direction of the bar blank 130 (see FIG. 5). The spring-biased ball unit 104 includes a retaining tube 1041 that is fixed to the vertical plate 91, a coiled compression spring 1042, and a ball 1043 that is disposed between the tube 1041 and the spring 1042 and that is biased by the spring 1042 to press against a bottom surface of the adjusting disk 101 or to engage a selected one of five positioning holes 1014 in the adjusting disk 101, thereby facilitating positioning of the adjusting disk 101 relative to the vertical plate 91.

The cutting depth-adjusting bolt 110 engages a threaded hole 912 in the vertical plate 91 and is rotatable to move the vertical plate 91 relative to the movable seat 53.

Referring to FIGS. 5, 6, and 7, when it is desired to use the tracing unit 70 so as to cut the bar blank 130 in a copying mode, the lock nut 722 is loosened such that the follower post 712 can be moved relative to the carrier 61 to a position, where the follower post 712 engages a lateral side of the sample bar 140 and where the lock nut 722 can be tightened. Subsequently, the adjusting disk 101 and the adjusting bolt 110 are adjusted to appropriate positions, where the disk 101 is spaced apart from the positioning post 102 at a distance that is sufficiently large to prevent the disk 101 from coming into contact with the positioning post 102 during operation, and where a rear end of the adjusting bolt 110 is spaced apart from the front side wall 531 of the movable seat 53 at a distance that is sufficiently large to prevent the adjusting bolt 110 from coming into contact with the front side wall 531 during operation. As such, the actuator member 55 can be rotated in a direction so as to move the movable seat 53 and the blade 82 along the driving rod 51 such that a groove pattern on the sample bar 140 is traced mechanically and is duplicated on the bar blank 130.

When the sample bar 140 is removed from the sample-holding unit 40, the operating lever 92 can be held to move the blade 82 in the axial and/or radial direction of the bar blank 130 so as to cut the bar blank 130 in a manual mode.

Alternatively, the actuator member 55 and the adjusting bolt 110 can be rotated simultaneously by the hands of the operator to feed the blade 82. Because the wall 537 is inclined, contact between the blade 82 and the bar blank 130 is visible to the operator during cutting.

Figure 12:
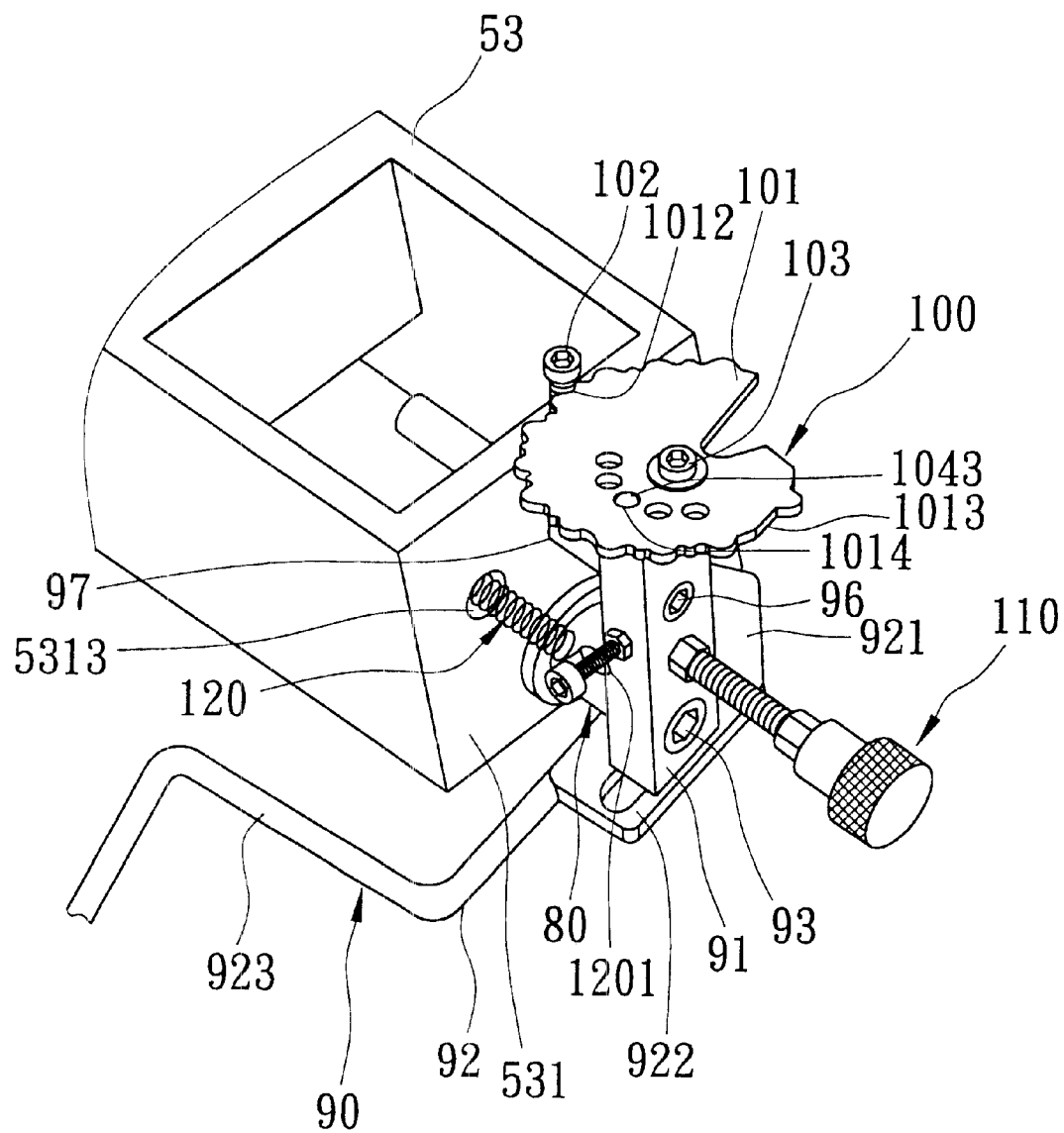
FIG. 12 is an assembled fragmentary perspective view of the preferred embodiment, illustrating how the cutting depth of a bar blank is fixed.

Referring to FIG. 12, when it is desired to fix the cutting depth of the bar blank 130 (see FIG. 5), the pivot bolt 103 is loosened so as to rotate the adjusting disk 101 to a desired angular position so that the positioning bolt 102 engages a desired notch 112 in the adjusting disk 101. As such, when the actuator member 55 is rotated, the blade 82 moves along the driving rod 51 in the axial direction of the bar blank 130 (see FIG. 5).

With this invention thus explained, it is apparent that numerous modifications and variations can be made without departing the scope and spirit of this invention. It is therefore intended that this invention be limited only as indicated by the appended claims.

I claim:

1. A wood lathe for cutting a cylindrical bar blank to form a groove pattern on the bar blank, the groove pattern being the same as that of a sample bar, said wood lathe comprising:
   an elongated lathe bed having a top surface with a longitudinally extending track unit that has a first end and a second end;
   a blank-holding unit including:
      a headstock disposed fixedly on said first end of said track unit,
      a first clamping element disposed rotatably on said headstock,
      an output shaft journalled within said headstock and connected fixedly to said first clamping element so as to rotate said first clamping element,
      a tailstock disposed movably on said second end of said track unit, and
      a second clamping element disposed rotatably on said tailstock and adapted to clamp and fix the bar blank between said first and second clamping elements such that the bar blank extends in a longitudinal direction of said lathe bed, thereby permitting rotation of the bar blank when said output shaft is rotated;
   a sample-holding unit disposed in front of said blank-holding unit and including a pair of first and second bases that are disposed movably on and that are locked releaseably on said track unit so as to be adapted to clamp and fix the sample bar therebetween;
   an axial moving unit including:
      a driving rod disposed fixedly between said headstock and said tailstock and adapted to extend in an axial direction of the bar blank, said driving rod being provided with a fixed gear-engaging member,
      a guide rod disposed fixedly between said headstock and said tailstock and extending parallel to said driving rod,
      a movable seat sleeved movably on said driving rod and said guide rod,
      a driving gear disposed rotatably on said movable seat and engaging said gear-engaging member of said driving rod in such a manner to permit movement of said movable seat along said driving rod and said guide rod when said gear rotates on said movable seat, and
      an actuator member disposed rotatably on and projecting outwardly from said movable seat, said actuator member being connected fixedly to said driving gear so as to rotate synchronously therewith;
   a radial moving unit including a carrier that is mounted movably on said movable seat so as to be movable relative to said movable seat in a radial direction of the bar blank;
   a tracing unit including:
      a vertical follower post disposed movably on said carrier and adapted to press against the sample bar in such a manner to permit sliding movement of said follower post on the sample bar when said movable seat moves relative to the sample bar, and
      a lock member for locking said follower post releaseably on said carrier, said lock member being operable to unlock said follower post from said carrier so as to permit movement of said follower post on said carrier in the radial direction of the bar blank;
      a spring adapted to bias said follower post to press against the sample bar; and
      a blade unit including a blade that is disposed movably on and that is locked releaseably on said carrier so as to move with said carrier in a feeding direction for cutting the bar blank, said blade being capable of being unlocked from said carrier so as to move relative to said carrier along the radial direction of the bar blank;
   wherein said movable seat includes a vertical front side wall, and a pair of parallel first and second side walls that extend respectively, integrally and rearwardly from two opposite sides of said front side wall and that are spaced apart from each other along the axial direction of the bar blank, each of said first and second side walls having an inner surface and a bottom surface, said carrier having two opposite sides which are provided respectively with two rotatable wheels, each of which has a large-diameter inner wheel portion that abuts against said inner surface of a respective one of said first and second side walls of said movable seat, and a small-diameter outer wheel portion that has a diameter smaller than that of said inner wheel portion and that abuts against said bottom surface of the respective one of said first and second side walls of said movable seat, whereby, said carrier is guided to move in the radial direction of the bar blank;
   whereby, said carrier and said movable seat can be moved along said track unit so that said follower post slides on the sample bar such that the groove pattern on the sample bar is traced mechanically and is duplicated on the bar blank.

2. The wood lathe as claimed in claim 1, wherein said carrier has a bottom surface, which is formed with a dovetail groove that has a T-shaped cross-section, said follower post having an externally threaded upper end, said tracing unit further including:
   an internally threaded cap confined within said dovetail groove in said carrier and engaging threadably said externally threaded upper end of said follower post, thereby fixing said follower post to said cap;
   a washer sleeved on said follower post and abutting against said bottom surface of said carrier; and
   a lock nut engaging said upper end of said follower post so as to press said washer against said bottom surface of said carrier, thereby fixing said follower post to said carrier, said lock nut constituting said lock member.

3. A wood lathe for cutting a cylindrical bar blank to form a groove pattern on the bar blank, the groove pattern being the same as that of a sample bar, said wood lathe comprising:

an elongated lathe bed having a top surface with a longitudinally extending track unit that has a first end and a second end;

a blank-holding unit including:
  a headstock disposed fixedly on said first end of said track unit,
  a first clamping element disposed rotatably on said headstock,
  an output shaft journalled within said headstock and connected fixedly to said first clamping element so as to rotate said first clamping element,
  a tailstock disposed movably on said second end of said track unit, and
  a second clamping element disposed rotatably on said tailstock and adapted to clamp and fix the bar blank between said first and second clamping elements such that the bar blank extends in a longitudinal direction of said lathe bed, thereby permitting rotation of the bar blank when said output shaft is rotated;

a sample-holding unit disposed in front of said blank-holding unit and including a pair of first and second bases that are disposed movably on and that are locked releaseably on said track unit so as to be adapted to clamp and fix the sample bar therebetween;

an axial moving unit including:
  a driving rod disposed fixedly between said headstock and said tailstock and adapted to extend in an axial direction of the bar blank, said driving rod being provided with a fixed gear-engaging member,
  a guide rod disposed fixedly between said headstock and said tailstock and extending parallel to said driving rod,
  a movable seat sleeved movably on said driving rod and said guide rod,
  a driving gear disposed rotatable on said movable seat and engaging said gear-engaging member of said driving rod in such a manner to permit movement of said movable seat along said driving rod and said guide rod when said gear rotates on said movable seat, and
  an actuator member disposed rotatable on and projecting outwardly from said movable seat, said actuator member being connected fixedly to said driving gear so as to rotate synchronously therewith;

a radial moving unit including a carrier that is mounted movably on said movable seat so as to be movable relative to said movable seat in a radial direction of the bar blank;

a tracing unit including:
  a vertical follower post disposed movably on said carrier and adapted to press against the sample bar in such a manner to permit sliding movement of said follower post on the sample bar when said movable seat moves relative to the sample bar, and
  a lock member for locking said follower post releaseably on said carrier, said lock member being operable to unlock said follower post from said carrier so as to permit movement of said follower post on said carrier in the radial direction of the bar blank;
  a spring adapted to bias said follower post to press against the sample bar; and
  a blade unit including a blade that is disposed movably on and that is locked releaseably on said carrier so as to move with said carrier in a feeding direction for cutting the bar blank, said blade being capable of being unlocked from said carrier so as to move relative to said carrier along the radial direction of the bar blank, said blade unit further including a blade-mounting rod that is disposed movably on said carrier and that is connected fixedly to said blade, said carrier having an upper end, which is shaped as a C-shaped clamp that clamps said blade-mounting rod therein, said clamp including upper and lower clamp ends that are formed respectively with an unthreaded hole and a threaded hole, and a lock bolt that engages said threaded holes in said clamp ends so as to lock said blade-mounting rod within said clamp;

wherein said movable seat has a vertical front side wall that is formed with a blade hole and a rail hole, said wood lathe further including:
  a vertical plate bolted to said blade-mounting rod and having a rear side surface and a bottom surface;
  an operating lever having a pivot end that is mounted rotatably to said movable seat, an intermediate portion that is shaped as a horizontal strip and that is formed with a longitudinal slide slot, and a grip end;
  a vertical engaging bolt fixed to said bottom surface of said vertical plate and extending through said slide slot in said operating lever so as to convert rotation of said operating lever into movement of said vertical plate; and
  a guide rail connected fixedly to and extending rearward from said rear side surface of said vertical plate and through said rail hole in said front side wall of said movable seat, said guide rail engaging fittingly and slidably said rail hole and adapted to extend in the radial direction of the bar blank so as to guide said blade to move in the radial direction of the bar blank;
  whereby, when said lock bolt is loosened, said blade-mounting rod can move on said carrier; and
  whereby, said carrier and said movable seat can be moved along said track unit so that said follower post slides on the sample bar such that the groove pattern on the sample bar is traced mechanically and is duplicated on the bar blank.

4. The wood lathe as claimed in claim 3, wherein said spring is a coiled tension spring that interconnects said movable seat and said vertical plate so as to pull said vertical plate toward said front side wall of said movable seat.

5. The wood lathe as claimed in claim 4, further comprising a cutting depth-fixing unit, which includes:
  a vertical pivot bolt;
  a horizontal adjusting disk disposed rotatably on and locked releaseably on said vertical plate by means of said pivot bolt and having a curved outer peripheral portion which is formed with a series of positioning notches that are spaced apart from said pivot bolt at different distances; and
  a positioning bolt fixed on an upper end of said front side wall of said movable seat and engaging a selected one of said positioning notches so that said vertical plate is spaced apart from said front side wall of said movable seat at a predetermined distance;

whereby, when said pivot bolt is loosened, said adjusting disk can be rotated so that said positioning bolt disengages from the selected one of said positioning notches and engages another one of said positioning notches, thereby varying distance between said vertical plate and said front side wall of said movable seat so as to adjust position of said blade relative to said carrier along the radial direction of the bar blank.

6. The wood lathe as claimed in claim 4, wherein said vertical plate has a threaded hole, said wood lathe further including a horizontal cutting depth-adjusting bolt which engages said threaded hole in said vertical plate and which has a rear end that is biased by said spring to abut against said front side wall of said movable seat, said cutting depth-adjusting bolt being rotatable to move said vertical plate relative to said movable seat.

7. A wood lathe for cutting a cylindrical bar blank to form a groove pattern on the bar blank, the groove pattern being the same as that of a sample bar, said wood lathe comprising:

- an elongated lathe bed having a top surface with a longitudinally extending track unit that has a first end and a second end;
- a blank-holding unit including:
  - a headstock disposed fixedly on said first end of said track unit,
  - a first clamping element disposed rotatably on said headstock,
  - an output shaft journalled within said headstock and connected fixedly to said first clamping element so as to rotate said first clamping element,
  - a tailstock disposed movably on said second end of said track unit, and
  - a second clamping element disposed rotatably on said tailstock and adapted to clamp and fix the bar blank between said first and second clamping elements such that the bar blank extends in a longitudinal direction of said lathe bed, thereby permitting rotation of the bar blank when said output shaft is rotated;
- a sample-holding unit disposed in front of said blank-holding unit and including a pair of first and second bases that are disposed movably on and that are locked releaseably on said track unit so as to be adapted to clamp and fix the sample bar therebetween;
- an axial moving unit including:
  - a driving rod disposed fixedly between said headstock and said tailstock and adapted to extend in an axial direction of the bar blank, said driving rod being provided with a fixed gear-engaging member,
  - a guide rod disposed fixedly between said headstock and said tailstock and extending parallel to said driving rod,
  - a movable seat sleeved movably on said driving rod and said guide rod,
  - a driving gear disposed rotatable on said movable seat and engaging said gear-engaging member of said driving rod in such a manner to permit movement of said movable seat along said driving rod and said guide rod when said gear rotates on said movable seat, and
  - an actuator member disposed rotatable on and projecting outwardly from said movable seat, said actuator member being connected fixedly to said driving gear so as to rotate synchronously therewith;
- a radial moving unit including a carrier that is mounted movably on said movable seat so as to be movable relative to said movable seat in a radial direction of the bar blank;
- a tracing unit including:
  - a vertical follower post disposed movably on said carrier and adapted to press against the sample bar in such a manner to permit sliding movement of said follower post on the sample bar when said movable seat moves relative to the sample bar, and
  - a lock member for locking said follower post releaseably on said carrier, said lock member being operable to unlock said follower post from said carrier so as to permit movement of said follower post on said carrier in the radial direction of the bar blank;
- a spring adapted to bias said follower post to press against the sample bar;
- a blade unit including a blade that is disposed movably on and that is locked releaseably on said carrier so as to move with said carrier in a feeding direction for cutting the bar blank, said blade being capable of being unlocked from said carrier so as to move relative to said carrier along the radial direction of the bar blank; and
- an L-shaped support frame, which includes a vertical frame portion that is connected fixedly to said movable seat, and a horizontal frame portion that is disposed slidably along said track unit, thereby stabilizing movement of said movable seat;
- whereby, said carrier and said movable seat can be moved along said track unit so that said follower post slides on the sample bar such that the groove pattern on the sample bar traced mechanically and is duplicated on the bar blank.

\* \* \* \* \*